Oct. 12, 1965

J. L. LOW III 3,211,413

CONCRETE FORMS AND COMPONENTS THEREOF

Filed Dec. 26, 1962

INVENTOR.
JOHN L. LOW III

BY
*L.S. Van Landingham, Jr.*
ATTORNEY

Oct. 12, 1965    J. L. LOW III    3,211,413
CONCRETE FORMS AND COMPONENTS THEREOF
Filed Dec. 26, 1962    5 Sheets-Sheet 4
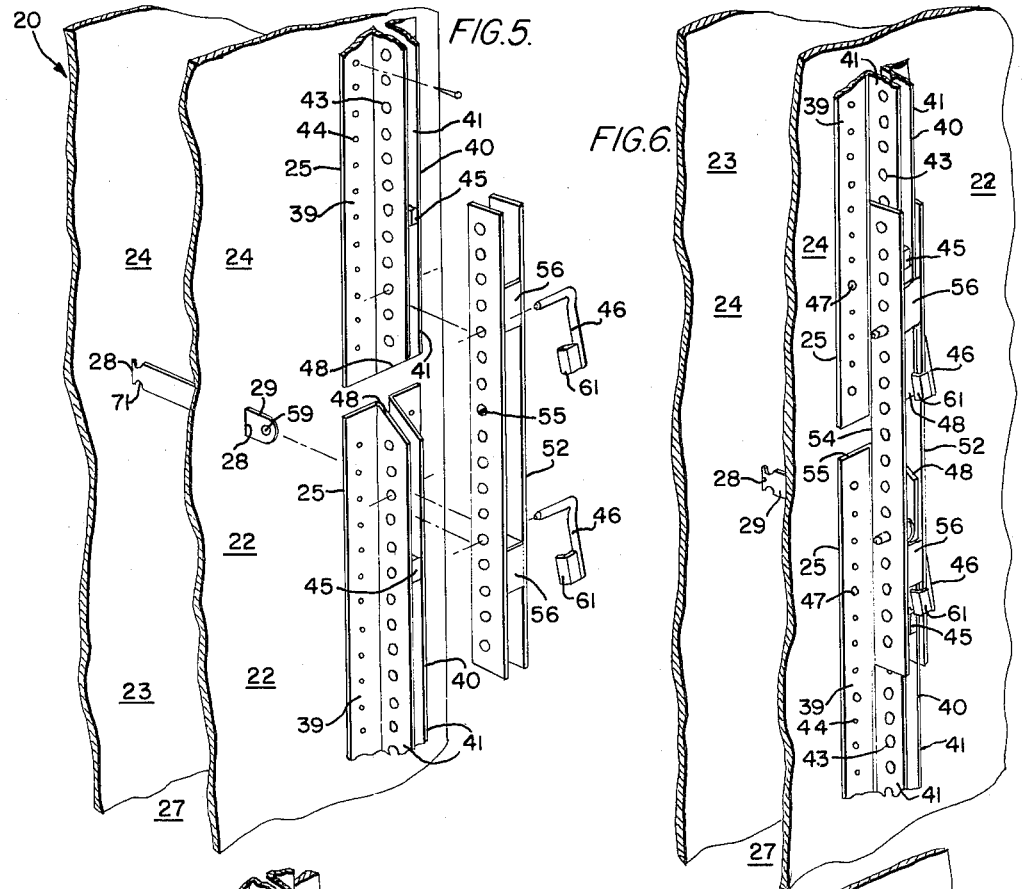
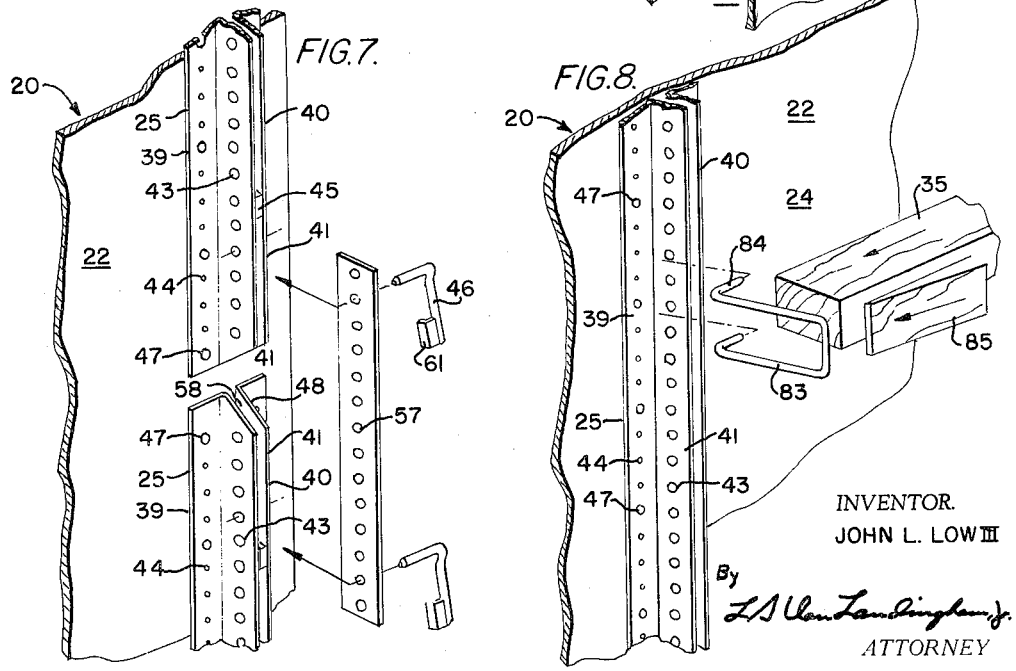
INVENTOR.
JOHN L. LOW III
By
*L. S. Van Landingham, Jr.*
ATTORNEY

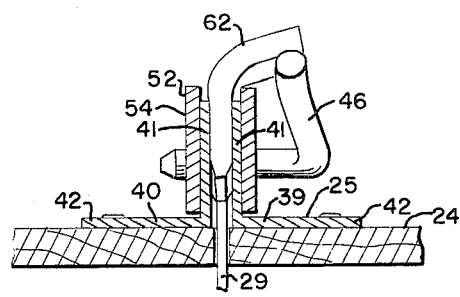
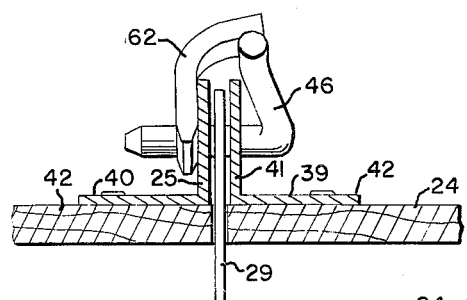
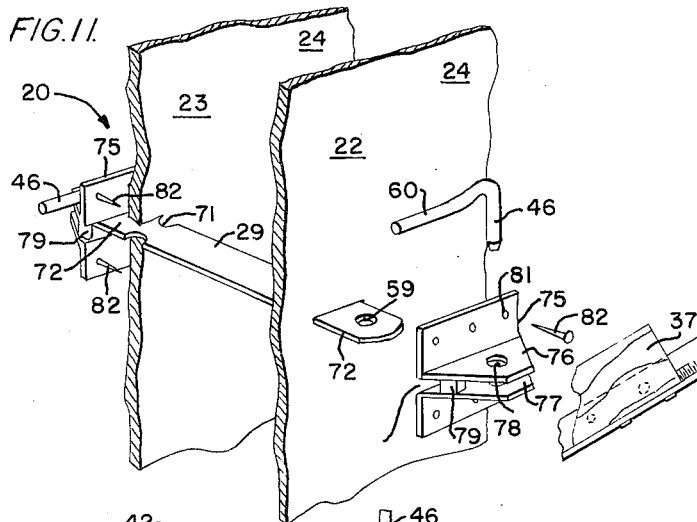
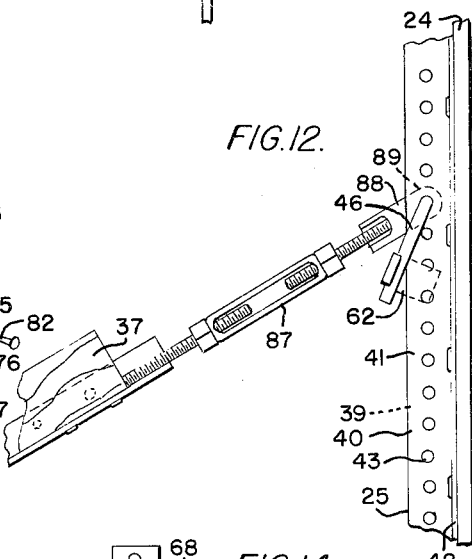
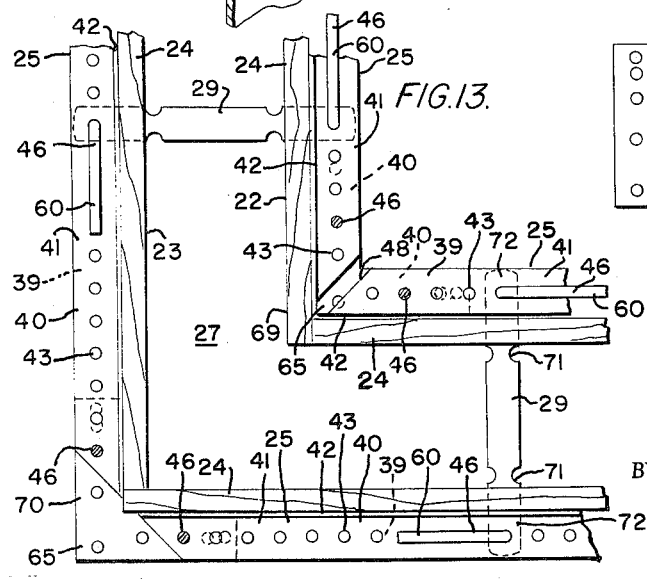
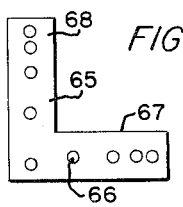

United States Patent Office 3,211,413
Patented Oct. 12, 1965

3,211,413
CONCRETE FORMS AND COMPONENTS
THEREOF
John L. Low III, P.O. Box 884, Laurel, Miss.
Filed Dec. 26, 1962, Ser. No. 247,113
10 Claims. (Cl. 249—41)

This invention relates to an improved concrete form including the reinforcing member of the invention as a component. The invention further relates to an improved reinforcing member useful for strengthening and joining panels for concrete forms and to a plurality of modular reinforcing members which may be connected together to provide a desired length. The invention further relates to panels with one or more of the reinforcing members described herein attached thereto, and to the use of such panels in the construction of concrete forms.

The economical construction of entirely satisfactory concrete forms at the site of use has been a longstanding problem in the art. One common type of concrete form construction at the site of use which enjoys wide usage in the industry includes spaced walls formed from panel members such as plywood and the like which are reinforced by means of wooden walers or studs nailed to the outside surfaces. The spaced panels are prevented from expanding outward to an undesired degree during pouring of the concrete by means of tie members which are attached to the spaced paneling members at a plurality of points. The resulting concrete form is very useful for pouring concrete walls but there are many disadvantages, one of which is the high cost of construction.

The cost of constructing concrete forms from conventional wooden panels and walers or studs is very substantial with respect to both materials and labor. Also, with repeated use it is necessary to discard the wooden panels, walers or studs after four or five usages due to extensive damage. While other types of walers and studs have been proposed heretofore, including steel, they have not met with general acceptance due to a number of reasons. One important reason is that steel walers or studs of prior art design cannot be used conveniently for dissimilar concrete forms without being cut to fit the specific concrete form being constructed. Since steel walers or studs are more expensive initially and harder to cut and form than those of wood, it is apparent that no generally satisfactory steel waler or stud has been available heretofore even though the need has long existed.

In accordance with one important embodiment of the invention, a modular waler or stud is provided which overcomes the above-mentioned difficulties and deficiencies of the prior art. By incorporating the modular waler or stud of the present invention in concrete form construction, the undue waste of materials characteristic of prior art concrete form construction ceases. By forming the walers or studs from steel, they are reusable over hundreds of times and in fact indefinitely. Thus, the first cost is normally the last cost, unless an item is damaged accidentally in use. Also, the modular walers or studs of the present invention allow the panel facing, which is normally of plywood or other simple fiber face, to be used a much greater number of times than is possible when employing the prior art walers and studs. A still further important feature of the walers or studs of the present invention is that a simple nodular joining member may be used in combination with varying the length of the walers or studs, and this combination allows the contractor to prepare any desired length of walers or studs. Additionally, inside or outside corners may be conveniently constructed by using special corner bars in combination with the modular walers or studs and joining member. In view of the above, the present invention provides for the first time an entirely satisfactory concrete form construction at the lowest possible cost in labor and materials.

It is an object of the present invention to provide an improved reinforcing member which may be used either as a stud or waler for strengthening and joining panels in the construction of concrete forms.

It is a further object to provide steel modular reinforcing members, one or more of which may be connected together, to thereby provide any desired length for use as studs or walers in concrete form construction.

It is still a further object to provide improved apparatus for connecting the reinforcing members of the invention to thereby form walers or studs of any desired length, and for attaching components to the reinforcing members.

It is still a further object to provide panels with the walers or studs of the invention attached thereto which are useful in concrete form construction.

It is still a further object to provide an improved concrete form construction which includes the novel reinforcing members disclosed herein.

Still other objects and advantages of the invention will be apparent to those skilled in the art upon reference to the following detailed description and the drawings, wherein:

FIGURES 5 and 6 are respective views, with portions thereof being broken away, illustrating the manner in which two or more reinforcing members of the invention may be connected by means of one type of joining bar;

FIGURE 7 is a perspective view, with portions thereof being broken away, illustrating the manner in which two or more reinforcing members of the invention may be connected by means of another type of joining bar;

FIGURE 8 is a perspective view, with portions thereof being broken away, illustrating the use of the reinforcing member of the invention for attaching an aligning member to the concrete form, to thereby aid in aligning and maintaining the concrete form in alignment;

FIGURE 9 is a cross-sectional view in elevation illustrating the use of the joining bar of FIGURES 5 and 6 and a preferred form of the tie pin for joining two reinforcing members and a tie simultaneously;

FIGURE 10 is a cross-sectional view in elevation illustrating the use of a preferred form of a tie pin for attaching a tie to a reinforcing member of the invention;

FIGURE 11 is a perspective view, with portions thereof being broken away, illustrating the use of a special tie holder for retaining a tie;

FIGURE 12 is a side view in elevation, with portions thereof being broken away, illustrating the use of the reinforcing member of the invention for anchoring one end of a bracing member to the concrete form;

FIGURE 13 is a plan view, with portions thereof being in section or broken away, of a corner for the concrete form constructed in accordance with the invention; and FIGURE 14 is a plan view of a corner bar useful in connecting reinforcing members of the invention when forming the inside or outside corners illustrated in FIGURE 13.

Figure 1:
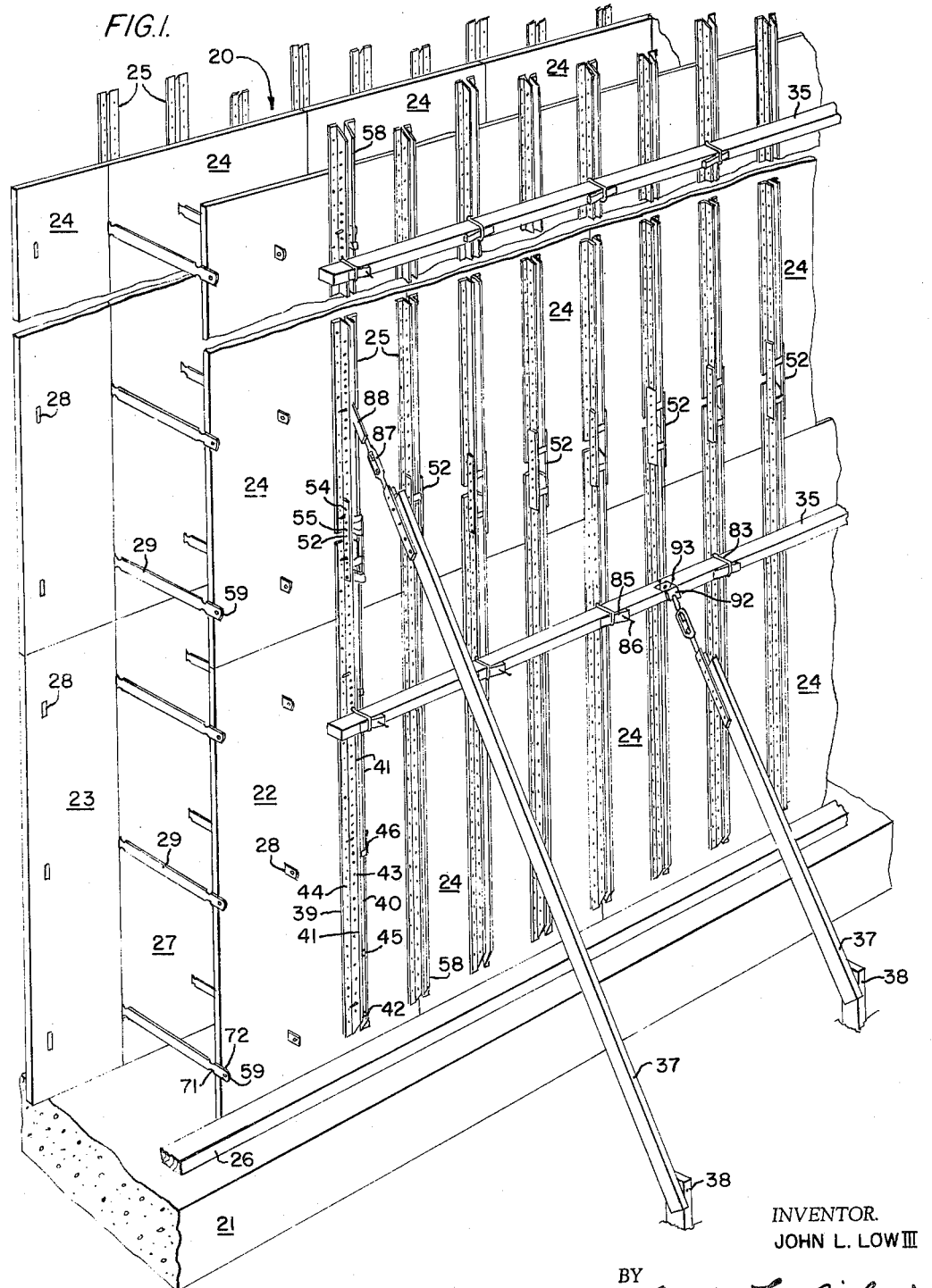
FIGURE 1 is a perspective view of a concrete form constructed in accordance with one embodiment of the invention, with portions thereof being broken away, and illustrating use of the reinforcing members of the invention as studs arranged lengthwise of the panel members.

Referring now to the drawings, the concrete form generally designated as 20 rests on concrete footing 21 and includes spaced walls 22 and 23 which may be formed from a plurality of panels 24. The panels 24 preferably are plywood sheets but any panel materials suitable for concrete form construction may be used including pressed wood panels such as "Masonite" and other panel materials prepared from natural wood, wood chips, shavings or fibers.

Figure 2:
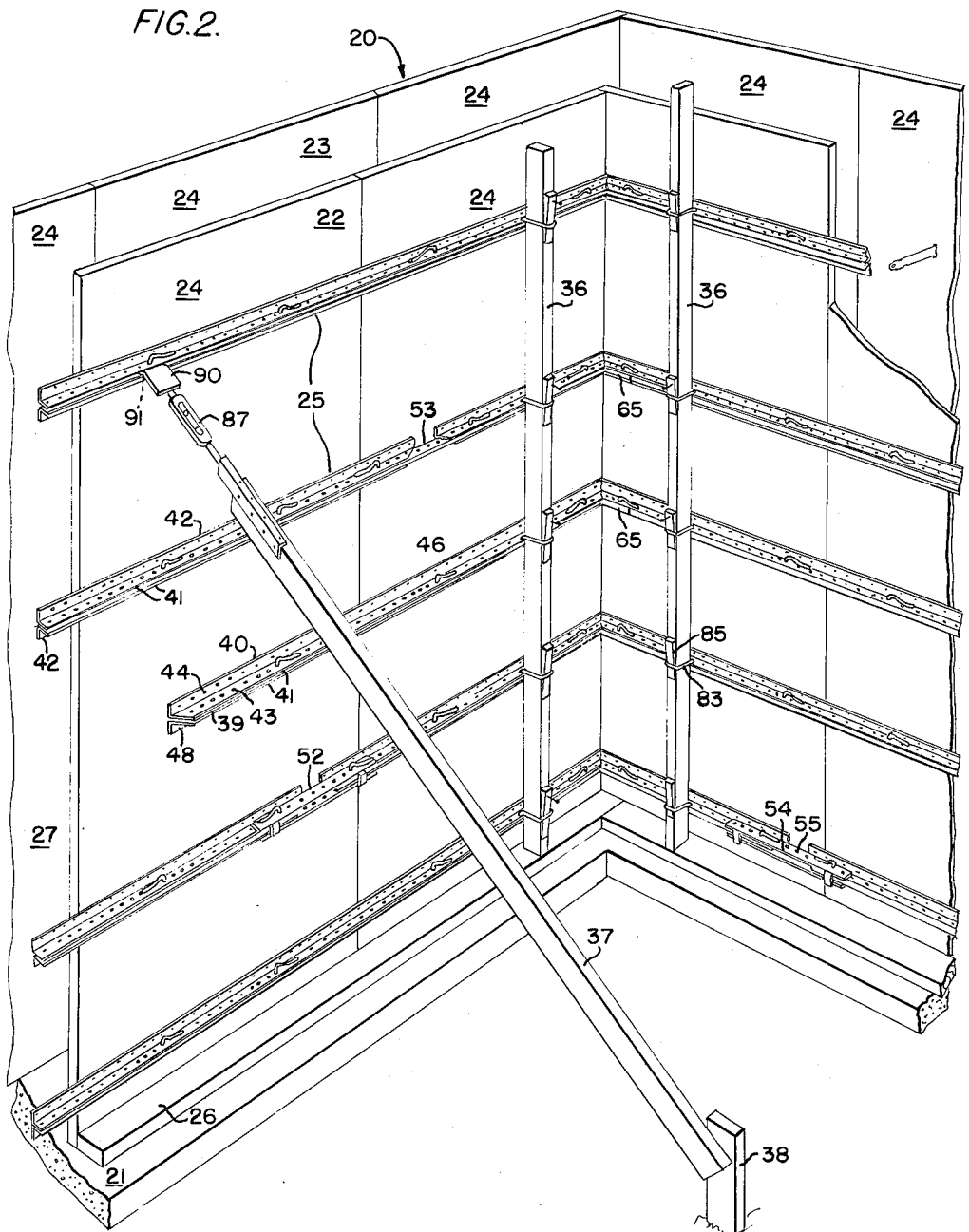
FIGURE 2 is a perspective view of a concrete form constructed in accordance with another embodiment of the invention, with portions thereof being broken away, illustrating use of the reinforcing members of the invention as walers arranged transversely with respect to the panel members.
Figure 3:
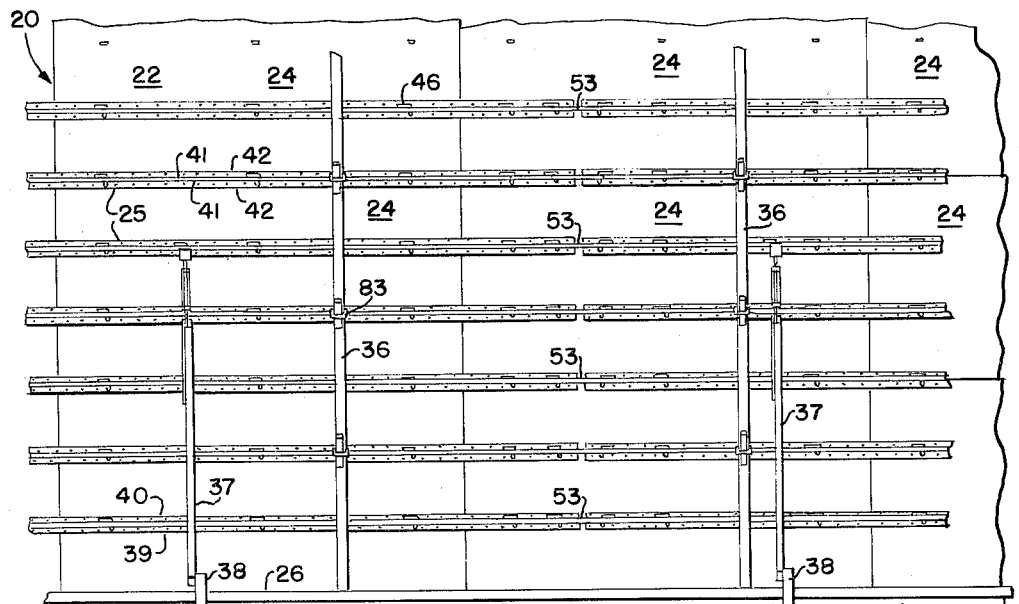
FIGURE 3 is a view in elevation of a concrete form constructed in accordance with another embodiment of the invention, with portions thereof being broken away, illustrating use of the reinforcing members of the invention as walers extending longitudinally with respect to the panel members.
Figure 4:
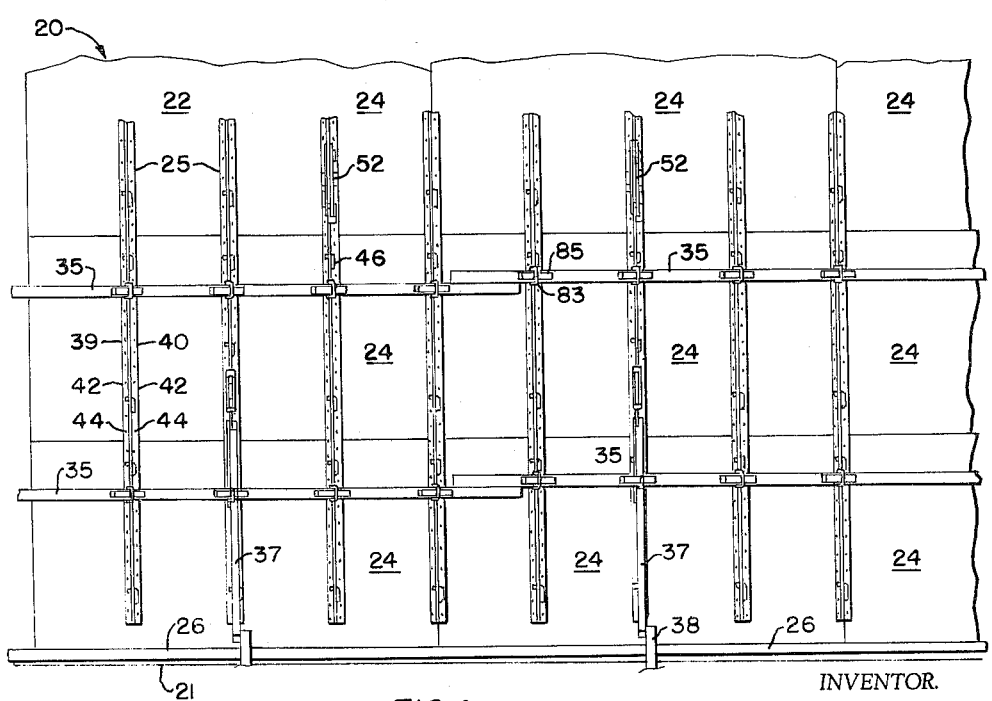
FIGURE 4 is a view in elevation of a concrete form constructed in accordance with another embodiment of the invention, with portions thereof being broken away, illustrating use of the reinforcing members of the invention as studs running transversely with respect to the panels.

The panels 24 are reinforced and joined together to form the walls 22 and 23 by means of reinforcing members 25. The reinforcing members 25 may be arranged on the panels 24 in a generally upright manner and used as studs as best seen in FIGURES 1 and 4, or the reinforcing members 25 may be arranged horizontally and used as walers as best seen in FIGURES 2 and 3. Also, the rectangular panels 24 such as illustrated in the drawings may be positioned in the walls 22 and 23 in an upright manner as best seen in FIGURES 1 and 2, or horizontally as best seen in FIGURES 3 and 4.

Longitudinally extending members 26 are attached to footing 21 in spaced relationship by nails, bolts or other suitable means not shown in the interest of simplifying the drawings. The members 26 are spaced apart a distance sufficient so that when the panels 24 for walls 22 and 23 are placed into position on the footing 21 as shown in the drawings, the resulting space or void 27 has a thickness as desired for the concrete wall to be poured. The panels 24 are provided with a plurality of slots 28 through which extend ties 29. The slots 28 may be spaced in predetermined positions whereby the ties extend through panels 24 in walls 22 and 23 for attachment to reinforcing members 25 in a manner which will be more fully discussed hereinafter. Since the ties 29 have a predetermined effective length and are attached at either end to reinforcing members 25 on walls 22 and 23, they prevent the reinforcing members 25 and the panels attached thereto from spreading apart a distance greater than desired and thus the thickness 27 of the concrete wall to be poured is controlled.

When the reinforcing members 25 are used as studs as best seen in FIGURES 1 and 4, horizontal aligning members 35 may be provided which extend across the reinforcing members 25 and are attached thereto in a manner which will be more fully described hereinafter. Similarly, when the reinforcing members 25 are used as walers as best seen in FIGURES 2 and 3, vertical aligning members 36 may be provided which likewise extend across the reinforcing members 25 and are attached thereto. Adjustable braces 37 are provided for walls 22 and 23 which are anchored at their lower ends by attachment to embedded stakes 38 by nails, bolts or other suitable means not shown in the interest of clarifying the drawings. The braces 37 are attached at their upper ends to reinforcing members 25 or aligning members 35 or 36 in a manner which will be more fully described hereinafter. The reinforcing members 25, aligning members 35 and 36, and braces 37 all coact to assure that the walls 22 and 23 are erected and maintained straight and true prior to and during pouring of the uncured concrete into space 27, and thereby assure that the resulting cured concrete wall is likewise straight and true.

As best seen in FIGURES 5–10, the reinforcing members 25 include two elongated angle portions 39 and 40. Each of the angle portions 39 and 40 have a first leg 41 and a second leg 42 which may be provided with a plurality of openings 43 and 44, respectively. The angle portions 39 and 40 are arranged whereby a first leg 41 of one of the angle portions 39 or 40 is in spaced relationship with a first leg 41 of the other angle portion and the second leg 42 of each of the angle portions is directed away therefrom to thereby form an elongated generally T-shaped portion which is best seen in FIGURES 9 and 10. The angle portions 39 and 40 may be joined together and maintained in spaced relationship by any convenient means such as by welding to a plurality of welding flats 45. As best seen in FIGURE 5, the openings 43 in the first legs 41 are aligned whereby the tie pins 46 may be inserted therethrough. The openings 44 may be of a size suitable to receive nails 47 whereby the reinforcing members may be attached to the panels 24. The ends 48 of angle portions 39 and 40 are sloped back at a suitable angle to allow an inside corner to be formed conveniently, as is best seen in FIGURE 13.

As best seen in FIGURES 5, 6 and 7, the reinforcing members 25 may be aligned longitudinally and connected by means of joining bars 52 or 53. With reference to FIGURE 5, the joining bar 52 may comprise a pair of spaced bars 54 provided with a plurality of aligned openings 55. The bars 54 are connected together and maintained in spaced relationship by welding to spacers 56. The openings 55 are also of a size and positioned so as to be in alignment with the openings 43 in legs 41 of angle portions 39 and 40. The bars 54 are spaced apart a distance sufficient to allow the joining bar 52 to be placed over the spaced first legs 41 of angles 39 and 40, as illustrated in FIGURE 6. When so positioned, the openings 55 and the openings 43 are in alignment, and the two tie pins 46 may be inserted through openings as shown to connect the two reinforcing members 25 together. With reference to FIGURE 7, the joining bar 53 may be a single bar as shown which is provided with openings 57 of a size and spacing similar to openings 55, and the bar may have a thickness allowing it to be readily inserted within space 58 between first legs 41 of angle portions 39 and 40. When so inserted, the openings 57 are in alignment with openings 43 and the tie pins 46 likewise may be passed therethrough as shown to lock the joining bar 53 in place and connect the two reinforcing members 25. While either of the joining bars 52 or 53 may be used and are generally satisfactory, often the joining bar 52 is preferred as it does not fill the space 58 and thus also allows a tie 29 to be connected to the reinforcing member 25 by means of the same tie pin 46, as best seen in FIGURE 9. This is not possible when using the joining bar 53.

The tie pins 46 may be of three types. As best seen in FIGURE 11, the tie pin 46 may be a generally L-shaped member 60 formed from a round rod of a diameter allowing it to be readily inserted through openings 43 and 55 or 57, and the opening 59 in ties 29. If desired, as shown in FIGURES 5, 6 and 7 the tie pin 46 also may include portion 61, which is designed to fit loosely in space 58 so that it may not be so readily dislodged upon vibration of the concrete form. The tie pin 46 also may be provided with a portion 63, as best seen in FIGURES 9 and 12, which is of a thickness to ensure frictional engagement with the legs 41 upon insertion into space 58. Thus, the tie pin 46 is securely held by friction within the space 58 and it is almost impossible for it to be displaced during vibration of the concrete form. As best seen in FIGURE 10, if desired the portion 63 may be arranged on the side of the legs 41 opposite that from which it was inserted, to thereby assure a frictional engagement with only one leg 41 of the angle portions 39 or 40 only. This arrangement likewise assures that the tie pin 46 remains in position when the concrete form is vibrated during pouring of the concrete mix.

In instances where an insider or outside corner is to be formed, as best seen in FIGURES 13 and 14 the reinforcing members 25 also may be joined together by means of the flat corner bar 65. The corner bar 65 has a plurality of spaced openings 66 of a size similar to openings 43 which are so arranged as to assure that an opening on either leg 67 or 68 is matched with openings 43 whether it is used for the inside corner 69 or the outside corner 70. The legs 67 and 68 of joining bar 65 are inserted within spaces 58 of the two reinforcing members 25 forming the corner 69 of 70, and tie pins 46 are inserted through the aligned openings 43 and 66 as shown.

As best seen in FIGURES 1, 5, 11 and 13, the flat tie 29 is provided with openings 59 in either end thereof. The tie 29 is of a predetermined length which is sufficient to provide a desired depth for space 27 when the tie pins 46 are inserted within the openings 59 to thereby lock the tie 29 to the reinforcing members 25, as shown in FIGURES 9, 10 and 13. The ties 29 also may be provided with portions 71 of reduced width, which readily allow the tie 29 to be broken by bending at that point when the concrete form has been removed from the concrete after setting. Thus, the end portions 72 may be removed from the concrete after it has set and they do not mar the appearance of the resulting concrete wall.

As best seen in FIGURE 11, in instances where it is not convenient to use an elongated reinforcing member 25, a small tie holder 75 may be provided. The tie holder 75 includes spaced angle portions 76 and 77, which are each provided with an opening 78. The openings 78 are in alignment to allow insertion of tie pin 46 therethrough. The angle portions 76 and 77 may be joined together and maintained in spaced relationship by welding to spaced welding flats 79, to thereby provide a space 80 for insertion of tie pin 29. The tie holder 75 is also provided with openings 81, whereby it may be nailed by means of nails 82 to panels 24 in a manner similar to the reinforcing members 25 discussed above. The tie holders 75 also may be joined to a reinforcing member 25 by means of the joining bar 52 to thereby form a short extension of the reinforcing member 25 which can still serve as a tie holder.

The reinforcing members 25 may be connected by means or joining bars 52 or 53 to form any length desired. For instance, the reinforcing members 25 may be constructed in a plurality of lengths differing by one foot and the joining bars 52 and 53 may be constructed so as to provide an effective length of at least twelve inches. The openings 43 in the reinforcing members 25, and the corresponding openings 55 or 57 in the joining bars may be placed on one inch centers to thereby allow any length of reinforcing members 25 to be constructed to within one inch of that desired. Thus, the invention provides for the first time a convenient modular reinforcing member for use in the construction of concrete forms at the site of use. While it is usually preferred that the reinforcing members 25 be constructed in even foot lengths such as one, five, six, seven or eight feet, and the joining bars to be constructed in twelve inch lengths and with the openings 43, 55 and 57 on one inch centers, this is not essential and other convenient lengths and spacing may be used.

In assembling the panels 24, the reinforcing members 25 may be placed over adjoining edges of the panels with the space 58 being directly thereover when this is possible. For instance, upon reference to FIGURES 1 and 3 it may be seen that the reinforcing members extend lengthwise along the rectangular panels 24, with the space 58 being immediately above the joint. In instances where the reinforcing members extend across the rectangular panels 24, as illustrated in FIGURES 2 and 4, then preferably a reinforcing member is arranged with the space 58 immediately above the ends of the panels. Additional reinforcing members may be spaced as necessary to provide the strength level required in the specific use. In instances where the panels are sufficiently small, it may be possible to use only reinforcing members at the longitudinal or transverse joints of the panels. However, in most instances where plywood and the like is used, it is necessary to have at least one and preferably two to four reinforcing members between those at the joints.

As is best seen in FIGURES 1 and 2, small aligned slots are cut in the panels or walls 22 and 23 as necessary to fit a given spacing for the reinforcing members 25, and positioned whereby ties inserted therethrough extend into the spaces 58. This allows insertion of the tie pins 46 through openings 59 in ties 29, to thereby securely lock or attach the ties 29 to the reinforcing members 25 on walls 22 and 23. Any convenient spacing for the ties may be used which is sufficient to assure a rigid wall structure, but it is usually preferred that about two-three ties for each eight feet of reinforcing member be used under conditions usually encountered in the field. It is also preferred that the reinforcing members 25 be connected by means of joining bars 52 or 53 at a point which is not directly above a joint in the panels.

In some instances, it is preferred to construct the concrete forms at the site of use from the reinforcing members 25 and panels 24 individually. However, when desired it is possible to have the panels 24 fitted to the reinforcing members 25 prior to shipping to the point of assembly into a concrete form. When this is done, reinforcing members 25 may be nailed to a panel as illustrated in the drawings and with ends of reinforcing members 25 extending outward from an individual panel and arranged to fit in connecting relationship with reinforcing members on adjacent panels. It is possible to use the reinforcing members in this manner without having to attach and remove them from the panels for each concrete form construction.

The aligning members 35 and 36 extend across the reinforcing members 25 and aid in proper aligning of the wall. As is best seen in FIGURES 1, 4 and 8, they may be attached to reinforcing members 25 by means of hooks 83, which are of a generally U-shaped configuration with bent ends 84 adapted to be inserted in openings 43. After inserting the ends 84 into openings 43, the aligning member 35 or 36, as the case may be, then may be inserted within the U-shaped portion of hook 83 and tightened into position by means of wedges 85. If desired, nails 86 may be provided for holding the wedges in position, as best seen in FIGURE 1. In instances where a given aligning member 35 or 36 is not of sufficient length to extend across the entire concrete form, then the terminating and continuing aligning member 35 or 36 each may be attached to the same reinforcing member to thereby aid in maintaining a rigid structure. Thus, the reinforcing member 25 by providing a plurality of openings 43 for use with the hooks 83 also allows the aligning members 35 and 36 to be joined.

The adjustable braces 37 may be attached by nails or bolts to the aligning members 35 or 36, or by means of tie pins 46 to the reinforcing members 25. For instance as best seen in FIGURE 12 the braces 37 may be provided on their upper ends with a turnbuckle 87, which in turn is provided with a flat extension 88 having an opening 89 adapted to receive tie pin 46 upon insertion of extension 88 into space 58. Also, in instances where the reinforcing members 25 are used horizontally as walers, the turnbuckles 87 may be provided with a plate 90 bent at an angle as illustrated in FIGURE 2 which allows it to be inserted within space 58 in reinforcing member 25. An opening 91 may be provided in plate 90, and it may be securely attached to the reinforcing members 25 by positioning in space 58 and inserting tie pin 46 through openings 43 and 91. Also, as best seen in FIGURE 1, the plate 90 may be provided with openings 92 of a size designed to receive nails 93, and thereby allow it to be nailed to the aligning members 35. It is apparent that the extension 88 is most useful when the reinforcing members 25 are being used as studs, while the plate 90 may be used when the reinforcing members 25 are being used as studs or walers. The turnbuckles 87 allow the braces 37 to be adjusted in length as desired and thereby aid in maintaining the walls 22 and 23 of the forms in proper positions.

In assembling a concrete form in accordance with the present invention, the longitudinal members 26 may be attached to an existing concrete footing in spaced relationship designed to provide a completed concrete wall having a desired thickness. Then, the panels 24 may be provided with slots 28 following a predetermined pattern, and the reinforcing members attached by nails inserted in openings 44. As was discussed above and illustrated in the drawings, preferably the reinforcing members are arranged over the joints for the panels in at least one direction, and also the slots 28 are spaced and arranged so that the ties 29 may be inserted therethrough and then into the spaces 58. This is followed by insertion of the tie pins 46 into the openings 59 and 43, to thereby securely fasten the ties 29 to the reinforcing members. As the wall construction is continued, the reinforcing members are joined as described by means of joining bars 52 or 53, and additional panels are added as described. Then, the aligning members 35 or 36 are attached, followed by attachment of braces 37 as described and alignment of the walls so as to be straight and true. The concrete form is then ready for pouring of the concrete mix. After pouring and setting of the concrete, the forms are removed following the steps described above in reverse, and the ends 72 of the ties 29 are broken at points 71 by bending. All the elements in the concrete form with the exception of the ties may be used numerous times in the manner described above without appreciable damage and thus a great saving of materials may be effected.

It is preferred that the reinforcing member 25 be constructed of steel. Also, it is preferred that the joining bars 52 and 53 and the tie pins 46 be constructed of steel. The reinforcing member 25 is shown in the drawings as being prepared from two 90° angle irons, but other angles may be used if desired in a specific instance. Also, it is possible to construct the member 25 from a single flat strip of steel by bending to the general configuration illustrated in the drawings with an inverted U-shaped portion which is a continuation upward of the legs 41 joining the angle portions 39 and 40 and thereby maintaining them in spaced relationship without the necessity for other means.

The foregoing detailed description and the drawings are intended for purposes of illustration only, and not as being limited to the spirit or scope of the appended claims.

What is claimed is:
1. A concrete form comprising
first and second wall portions, the first and second wall portions being in spaced relationship to thereby provide a space therebetween for receiving concrete mix,
a plurality of reinforcing members mounted on each of the first and second wall portions, each of the reinforcing members including
two angle irons, each of the angle irons having intersectiong first and second legs which form an approximately 90° angle at the intersection, the angle irons being arranged alongside each other in spaced relationship whereby the first leg of one of the angle irons is in spaced relationship with the first leg of the other angle iron and the second leg of each of the angle irons is directed away from the spaced first legs to thereby form an elongated portion having a generally T-shaped cross section,
the first legs of each of the angle irons having a plurality of spaced openings formed therein along their length at regularly occurring intervals, a plurality of the spaced openings in one of the first legs being aligned with a plurality of the spaced openings in the other first leg,
the second legs of each of the angle irons having a plurality of openings formed therein, and
means for connecting the angle irons and maintaining the first legs of each of the angle irons in said spaced relationship,
at least a portion of the plurality of reinforcing members being aligned longitudinally in spaced relationship ,
means for connecting a plurality of longitudinally aligned reinforcing members, the last named means including an elongated joining member having a plurality of spaced openings formed therein along its length at regularly occuring intervals, the openings in the end portions of the joining member being in alignment with selected aligned openings in the end portions of the first legs of the reinforcing members whereby the combined effective length of the reinforcing members and the joining member may be adjusted, and fastening members inserted through the aligned openings in the end portions of the joining member and the first legs of the reinforcing members,
means for mounting reinforcing members on the first and second wall portions, the second legs of the reinforcing members being mounted on the exterior surfaces of the first and second wall portions by mounting means including members inserted through the openings therein,
a plurality of tie members,
a plurality of spaced openings in each of the first and second wall portions for receiving the tie members, the openings in the first wall portion being aligned with the openings in the second wall portion whereby the tie members may be inserted therethrough,
the reinforcing members being positioned on the first and second wall portions whereby the spaces between the first legs are also aligned with the aligned openings of the first and second wall portions,
the tie members extending through the aligned openings in the first and second wall portions and the end portions thereof extending into the aligned spaces between the first legs of the reinforcing members on the first and second wall portions, the end portions of the tie members having openings formed therein which are aligned with the openings in the first legs of the reinforcing members, and
means carried by the reinforcing members on the first and second wall portions for securely holding the end portions of the tie members, the last named means including fastening members inserted through the aligned openings in the end portions of the tie members and the openings in the first legs of the reinforcing members.

2. The concrete form of claim 1 wherein the means for connecting the said plurality of longitudinally aligned reinforcing members includes
an elongated bar, at least end portions of the bar being positioned between end portions of the spaced first legs of two longitudinally aligned reinforcing members to be connected,
the bar having a plurality of openings formed therein, the openings in the bar being spaced at intervals so as to have openings in the end portions thereof in alignment with the openings in the end portions of the first legs of the two reinforcing members to be connected, and
fastening means including members inserted through the aligned openings in the end portions of the bar and the end portions of the first legs of the two reinforcing members whereby the two reinforcing members are connected.

3. The concrete form of claim 2 wherein the fastening means includes generally L-shaped tie pins having first and second legs, the first legs being inserted through the aligned openings in the end portions of the bar and the end portions of the first legs of the two reinforcing members whereby the two reinforcing members are connected, and a tongue on the second legs of the tie pins, the tongues being positioned between the spaced first legs of the reinforcing members and being securely held by frictional engagement therewith.

4. The concrete form of claim 1 wherein the means for connecting the said plurality of longitudinally aligned reinforcing members includes a joining member comprising spaced metallic strips and means for maintaining the strips in spaced relationship, the end portions of the spaced first legs of two longitudinally aligned reinforcing members to be connected being positioned between at least the end portions of the spaced strips of the joining member, each of the spaced strips of the joining member having a plurality of aligned openings formed therein, the openings in the strips being spaced at intervals so as to have openings in the end portions thereof in alignment with the openings in the end portions of the first legs of the two reinforcing members to be connected, and fastening means including members inserted through the aligned openings in the end portions of the strips of the joining member and the end portions of the first legs of the two reinforcing members whereby the two reinforcing members are connected.

5. The concrete form of claim 4 wherein the fastening means includes generally L-shaped tie pins having first and second legs, the first legs being inserted through the aligned openings in the end portions of the strips of the joining member and the end portions of the first legs of the two reinforcing members whereby the two reinforcing members are connected, and a tongue on the second legs of the tie pins, the tongues being positioned between the spaced first legs of the reinforcing members and being securely held by frictional engagement therewith.

6. The concrete form of claim 1 wherein the first and second wall portions are formed of a plurality of rectangular plywood panels, the plywood panels are arranged in the wall portions with the longer dimension being in a generally upright position, the reinforcing members are arranged on the wall portions in a generally upright position whereby they serve as studs, and at least a portion of the upright reinforcing members are positioned on the plywood panels whereby the second legs thereof bridge seams between the panels.

7. The concrete form of claim 1 including a substantially straight aligning member, the aligning member extending across the reinforcing members, means for attaching the aligning member to the reinforcing members including a plurality of spacing attaching members, each of the attaching members having a portion joined to a reinforcing member by means of at least one member inserted through aligned openings in the first legs of the reinforcing members.

8. The concrete form of claim 1 wherein the fastening members for the tie members include generally L-shaped tie pins having first and second legs, the first legs being inserted through the aligned openings in the end portions of the tie members and the openings in the first legs of the reinforcing members whereby the end portions of the tie members are securely held, and a tongue on the second legs of the tie pins, the tongues being in frictional engagement with the first legs of the reinforcing members and being securely held thereby to prevent the tie pin from becoming dislodged.

9. The concrete form of claim 1 wherein the said openings in the first legs of the reinforcing member are formed on approximately one-inch centers.

10. The concrete form of claim 1 including an elongated brace member, means for adjusting the length of the brace member,
means for anchoring one end of the brace member at a point remote from the concrete form, and
means for attaching the other end of the brace member to the concrete form, the last named means including an opening in the end of the brace member which is aligned with openings in the first legs of a reinforcing member and a fastening member inserted through the aligned openings in the brace member and the first legs of a reinforcing member.

References Cited by the Examiner

UNITED STATES PATENTS

| 1,101,592 | 6/14 | Wagner. | |
| 1,113,317 | 10/14 | Dzieman | 25—131.5 |
| 1,520,965 | 12/24 | Pulis et al. | 25—131 |
| 1,970,547 | 8/34 | Anderson | 25—131 |
| 2,297,899 | 10/42 | Krueger | 25—131 |
| 2,312,983 | 3/43 | Summers | 25—131 |
| 2,511,584 | 6/50 | Hill. | |
| 2,618,039 | 11/52 | Hyre | 25—131 |
| 2,948,045 | 8/60 | Imonetti | 25—131 |
| 3,035,321 | 5/62 | Henning | 25—131 |

FOREIGN PATENTS

| 76,101 | 6/53 | Denmark. |
| 535,669 | 11/55 | Italy. |

J. SPENCER OVERHOLSER, *Primary Examiner.*

MICHAEL V. BRINDISI, WILLIAM J. STEPHENSON, *Examiners.*